United States Patent
Enz

(10) Patent No.: US 9,340,160 B2
(45) Date of Patent: May 17, 2016

(54) LOW DISTORTION CONVEX MIRROR FOR A VEHICLE REARVIEW MIRROR ASSEMBLY

(71) Applicant: Lang-Mekra North America, LLC, Ridgeway, SC (US)

(72) Inventor: Andreas Enz, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 14/450,440

(22) Filed: Aug. 4, 2014

(65) Prior Publication Data

US 2016/0031375 A1     Feb. 4, 2016

(51) Int. Cl.
  G02B 5/10      (2006.01)
  B60R 1/08      (2006.01)
  G02B 27/00     (2006.01)
  G02B 5/08      (2006.01)

(52) U.S. Cl.
  CPC . *B60R 1/082* (2013.01); *B60R 1/08* (2013.01); *G02B 5/0808* (2013.01); *G02B 27/0025* (2013.01)

(58) Field of Classification Search
  CPC ............ B60R 1/06; B60R 1/08; B60R 1/081; B60R 1/082; G02B 5/10
  USPC .................... 359/864, 866, 868, 900
  See application file for complete search history.

(56) References Cited

U.S. PATENT DOCUMENTS

| | | | |
|---|---|---|---|
| 2,417,704 A * | 3/1947 | Rylsky | G01B 11/26 116/202 |
| 4,035,064 A * | 7/1977 | Cowman, Jr. | B29D 11/00596 359/868 |
| 5,005,962 A | 4/1991 | Edelman | |
| 5,113,292 A | 5/1992 | Simson | |
| 5,307,211 A | 4/1994 | Schmidt et al. | |
| 5,621,569 A * | 4/1997 | Schlenke | B60R 1/081 359/603 |
| 5,793,542 A * | 8/1998 | Kondo | B60R 1/082 359/864 |
| 5,812,331 A * | 9/1998 | Lopez | H01Q 15/18 342/47 |
| 6,069,755 A * | 5/2000 | Li | B60R 1/082 359/727 |
| 6,282,771 B2 | 9/2001 | Englander | |
| 6,398,377 B1 * | 6/2002 | Chou | B60R 1/082 359/866 |
| 7,129,829 B2 * | 10/2006 | Chan | B60Q 1/2665 340/470 |
| 7,517,100 B2 * | 4/2009 | Englander | B60R 1/08 359/851 |
| 7,686,464 B2 | 3/2010 | Compton et al. | |
| 7,780,901 B2 | 8/2010 | Masse et al. | |
| 8,192,032 B2 | 6/2012 | Takahashi et al. | |
| 2009/0231740 A1 | 9/2009 | Wu et al. | |
| 2010/0246040 A1 | 9/2010 | Lee | |
| 2012/0099173 A1 * | 4/2012 | Gentry | G02B 17/06 359/265 |

* cited by examiner

*Primary Examiner* — Ricky D Shafer
(74) *Attorney, Agent, or Firm* — McNair Law Firm, P.A.; Seann P. Lahey

(57) ABSTRACT

A substrate having a light reflective coating defining a mirror surface. A first curvature included on the substrate extending across the mirror surface oriented along a first axis of curvature extending heightwise. A second curvature included on the substrate extending across the mirror surface oriented along a second axis of curvature extending widthwise. The second axis of curvature is angled relative to the first axis of curvature so that the second curvature extends across the mirror surface in a helical arrangement relative to the first axis of curvature. Accordingly, angling the second axis of curvature relative to the first axis of curvature causes the first and second curvatures to cooperate in reducing distortion across the mirror surface.

26 Claims, 9 Drawing Sheets

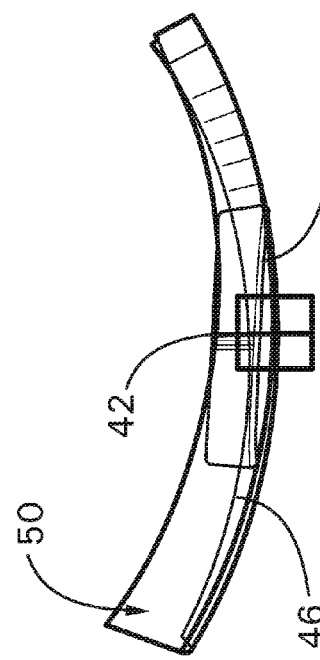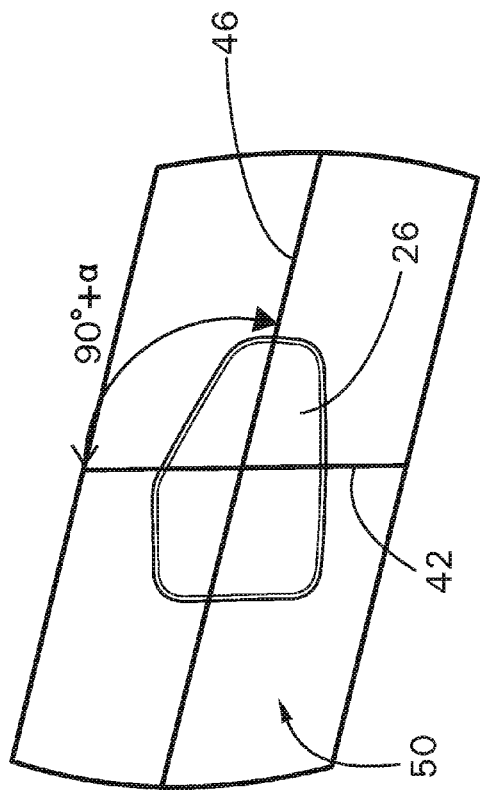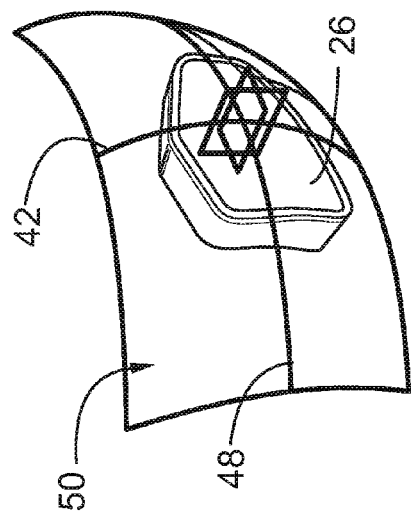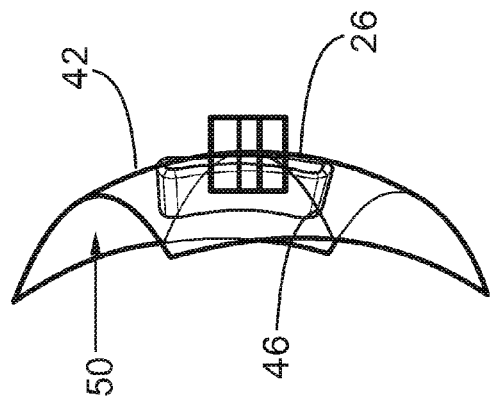

LH FLAT MIRROR

RH Main Dual Radius

RH Main Flat

LOW DISTORTION CONVEX MIRROR FOR A VEHICLE REARVIEW MIRROR ASSEMBLY

BACKGROUND OF THE INVENTION

1) Field of the Invention

The present invention relates to vehicle mirrors, and more particularly to exterior convex rearview vehicle mirrors.

2) Description of Related Art

Curved rearview mirrors, often referred to as spot-mirrors, that are typically used around a vehicle exterior have a spherical convex shape with a constant curvature. The convex mirror provides a wider field of view than a standard flat mirror surface.

There are also rearview mirrors that feature a surface with varying curvatures where the curvature typically increase towards the outboard edge of the mirror. these types of varying curvature mirrors provide a wider field of view than a plain constant curvature convex mirror, but also exhibit extreme distortion towards the outboard edge as the curvature increases. However, referring to FIG. 5, even a simple convex mirror with a spherical constant radius of curvature distorts the perceived image significantly. This distortion gets stronger when viewing the mirror surface at an angle. For rearview vehicle mirrors, this means that the worst case for viewing a convex mirror is on the right hand side of the vehicle since the driver looks onto the mirror surface more from the side instead of perpendicular to the mirror surface.

With reference to FIG. 6, to counteract the natural distortion of spherical convex mirrors while maintaining the increased field of view, several attempts have been described in the prior art that relate to dual radius mirror designs. The dual radius design involves curving the mirror surface along two different axis of curvatures with different radius of curvatures. A first axis is defined as extending heightwise relative to the mirror surface, and a second axis is defined as extending widthwise relative to the mirror surface. The radius of curvature extending heightwise along the first axis is typically smaller than the radius of curvature extending widthwise along the second axis. This can be envisioned by having two circle portions, one smaller than the other with the smaller circle defining a plane aligned vertically along the first axis, and a second circle defining a plane aligned horizontally. The circles are arranged so they intersect each other with the associated planes of the circles perpendicular to each other and the center of the mirror face being located at the intersecting perimeter of the circles. The mirror surface is created by sweeping the smaller radius circle along the larger radius circle in a way that the associated plane of the smaller circle is always perpendicular to the larger circle's curve. Thus, the first axis of curvature is arranged perpendicular to the second axis of curvature.

The image produced by utilizing a dual radius mirror surface of the type known in the prior art more faithfully maintains the width and height proportions of the targeted objects as opposed to a spherical convex mirror or convex mirror with varying radius of curvature. However, the shape still exhibit a "sheer-distortion" making objects appear to be heavily slanted and leaning outboard.

Accordingly, it is an object of the present invention to reduce distortion associated with a convex mirror while providing a vehicle driver with a wider field of view than a flat mirror surface.

It is another object of the present invention to balance the field of view available to a driver between left and right exterior rearview mirror assemblies.

SUMMARY OF THE INVENTION

The above objectives are accomplished according to the present invention by providing a low distortion convex mirror for a vehicle rearview mirror assembly, said mirror comprising: a substrate having a light reflective coating defining a mirror surface; a first curvature included on said substrate extending across said mirror surface oriented along a first axis of curvature extending heightwise; a second curvature included on said substrate extending across said mirror surface oriented along a second axis of curvature extending widthwise, wherein said second axis of curvature is angled relative to said first axis of curvature so that said second curvature extends across said mirror surface in a helical arrangement relative to said first axis of curvature; whereby, angling said second axis of curvature relative to said first axis of curvature causes said first and second curvatures to cooperate in reducing distortion across said mirror surface.

In a further advantageous embodiment, the substrate is selected from the group consisting of plastic, metal, glass, carbon fiber, and combinations thereof.

In a further advantageous embodiment, the first curvature has a constant radius of curvature.

In a further advantageous embodiment, said first curvature has a variable radius of curvature.

In a further advantageous embodiment, said second curvature has a constant radius of curvature.

In a further advantageous embodiment, said second curvature has a variable radius of curvature.

In a further advantageous embodiment, said second axis of curvature is angled relative to said first axis of curvature according to a compensation angle.

In a further advantageous embodiment, said compensation angle is defined by a predefined eye-point, a horizontal plane created at said predefined eye-point, and an intersect line originating at said predefined eye-point extending to said mirror surface as it is positioned respective to said vehicle and intersecting said first axis of curvature.

In a further advantageous embodiment, said compensation angle is measured as angle $\alpha$ between said horizontal plane and said intersecting line extending to said mirror surface.

In a further advantageous embodiment, said intersecting line extends to a midpoint of said mirror surface.

In a further advantageous embodiment, the angle of said second axis of curvature to said first axis of curvature is defined as $90°+\alpha$.

In a further advantageous embodiment, said predefined eye-point is designated within a vehicle cab at a location approximated to represent a line-of-sight view of a driver of a predetermined height within said vehicle cab to said mirror surface.

The above objectives are further accomplished according to the present invention by providing a method of providing a low distortion convex mirror for a vehicle rearview mirror assembly, said method comprising the steps of providing a substrate; applying a light reflective coating to said substrate defining a mirror surface; forming a first curvature on said substrate extending across said mirror surface oriented along a first axis of curvature extending heightwise; forming a second curvature on said substrate extending across said mirror surface oriented along a second axis of curvature extending widthwise, wherein said second axis of curvature is angled relative to said first axis of curvature so that said second curvature extends across said mirror surface in a helical arrangement relative to said first axis of curvature; whereby, angling said second axis of curvature relative to said first axis of curvature causes said first and second curvatures to cooperate in reducing distortion across said mirror surface.

In a further advantageous embodiment, the method includes selecting said substrate from the group consisting of plastic, metal, glass, carbon fiber, and combinations thereof.

In a further advantageous embodiment, the method includes the step of angling said second axis of curvature relative to said first axis of curvature according to a compensation angle.

In a further advantageous embodiment, the method includes the step of defining said compensation angle by selecting a predefined eye-point, designating a horizontal plane extending at said predefined eye-point, and extending an intersect line originating at said predefined eye-point to said mirror surface as it is positioned respective to said vehicle.

In a further advantageous embodiment, the method includes the step of measuring the angle between said horizontal plane and said intersecting line extending to said mirror surface to determine an angle $\alpha$ defining said compensation angle.

In a further advantageous embodiment, the method includes the step of extending said intersecting line to a midpoint of said mirror surface.

In a further advantageous embodiment, the method includes the step of angling said second axis of curvature 90°+$\alpha$ relative to said first axis of curvature.

In a further advantageous embodiment, the method includes the step of designating said predefined eye-point within a vehicle cab at a location approximated to represent a line-of-sight view of a driver of a predetermined height within said vehicle cab to said mirror surface.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIGS. 8A-8D show a dual radius convex mirror surface in which the heightwise axis of curvature and the widthwise axis of curvature are angled relative to each other according to the present invention;

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. The goal of the new and improved shape is to further counteract the distortion of the image by changing the way the mirror is shaped. Introducing a slanting compensation angle (a) (see FIG. 9) into the design of the mirror surface on a dual radius mirror can eliminate most of the sheering distortion associated with dual radius mirror designs known in the prior art. Additionally, this can also be used to customize the mirror images to a vehicle driver to better balance the fields of view available in the left and right side mirrors.

Figure 1:
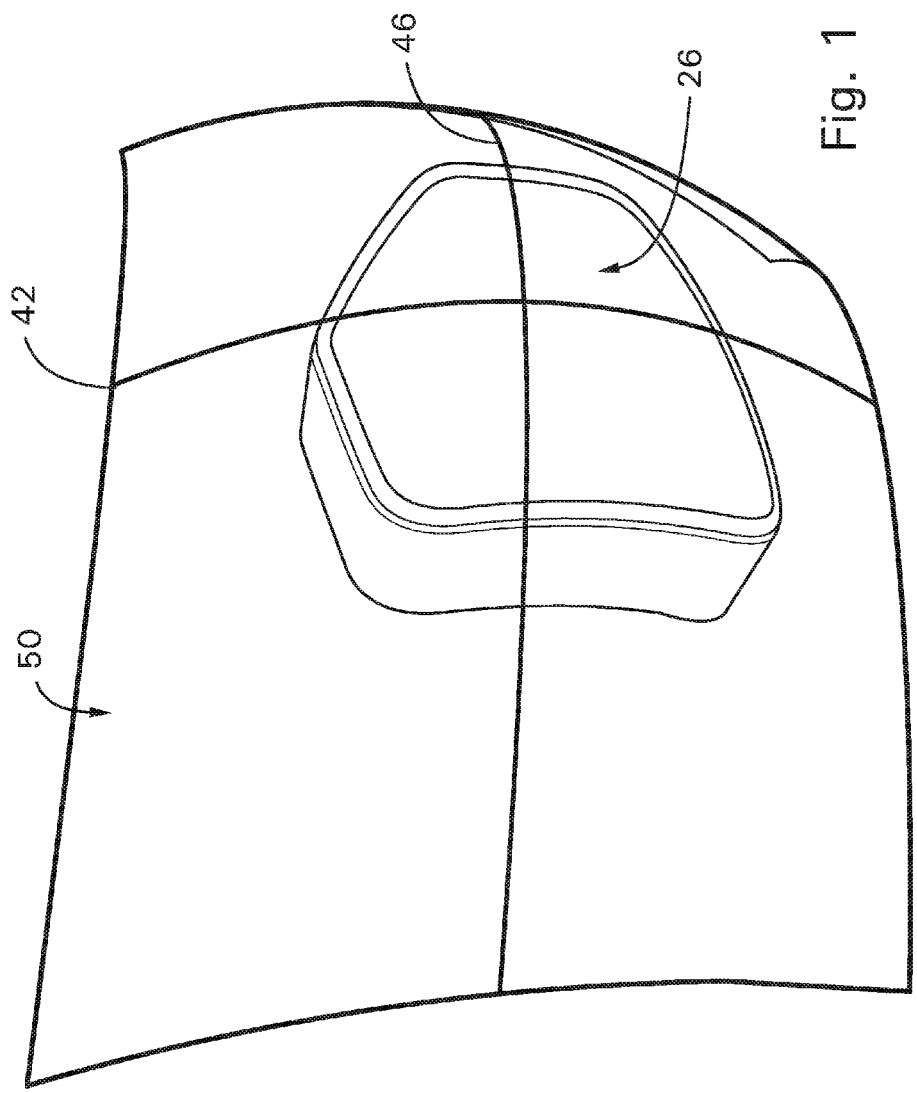
FIG. 1 shows a perspective view of a vehicle rearview mirror having a convex dual radius surface according to the present invention.
Figure 2:
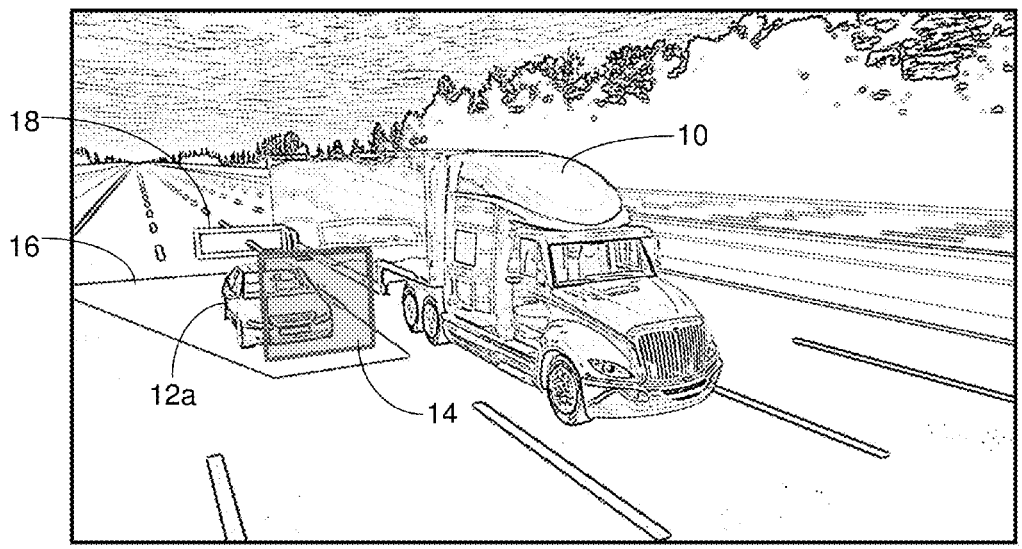
FIG. 2 shows a reference image of a passenger vehicle alongside a large commercial vehicle.
Figure 3:
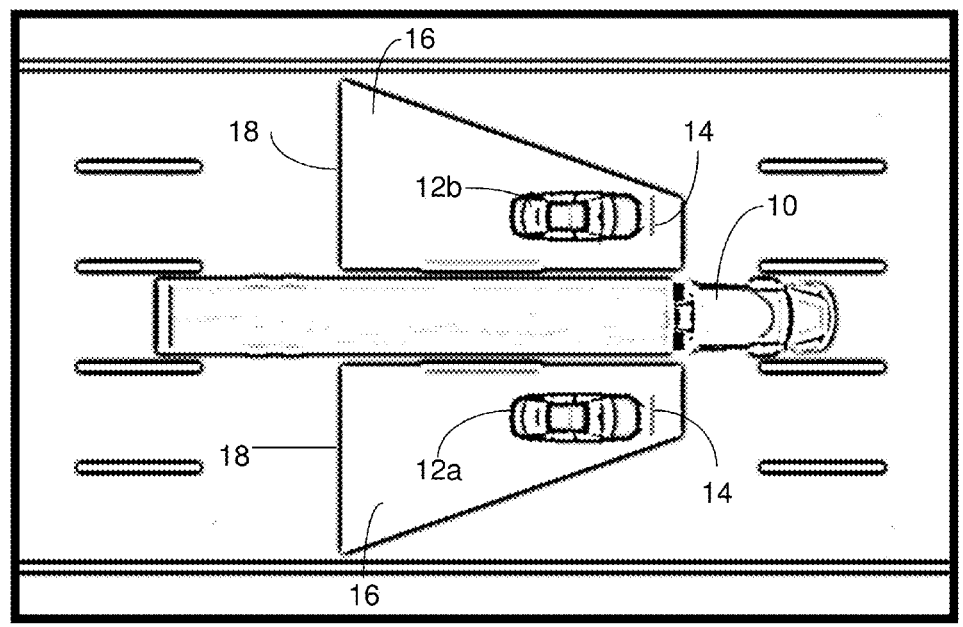
FIG. 3 shows a top view of the reference image in FIG. 2.

Referring to FIGS. 2 and 3, a 3D scene has been established as a reference to create simulated images of the effect of different mirror geometries to illustrate the reduced distortion accomplished by the present invention over the prior art. A commercial truck model 10 has been placed in the middle lane of a interstate highway and two cars 12a and 12b are placed on the left and the right side of truck 10. A perfectly square reference target 14 has been set in front of cars 12a and 12b. The ground on the left and the right side underneath the cars is marked with a ground target 16, and a reference rectangle 18 is placed floating over the rear edge of ground target 16.

The images in the simulated illustrations described herein are calculated using sophisticated rendering algorithms that can simulate the physically accurate behavior of reflections on any type of geometrically shaped surface. A perspective projection method is used from a predefined driver's eye location within the vehicle to simulate what the driver of a vehicle will see in the mirrors.

Figure 4:
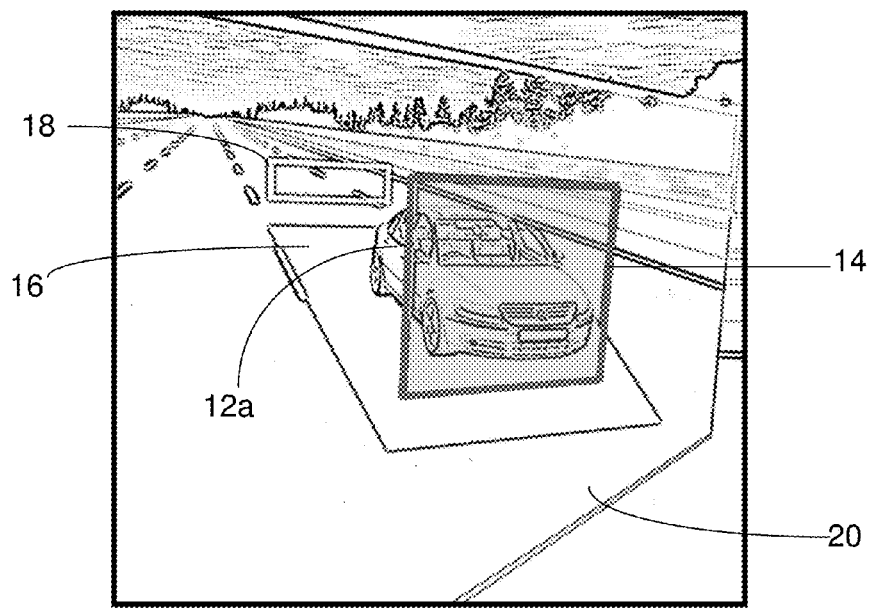
FIG. 4 shows a flat mirror surface reflection of a portion of the reference image of FIG. 2 as viewed from inside the large commercial vehicle.

Referring to FIG. 4, this image is used as the target benchmark for the right hand side mirror. It represents the ideal undistorted rearview perceived from the driver's eye point. This has been archived by placing a very large flat mirror surface 20 oriented in a way that it's reflection shows the scene on the right hand side of truck 10. The truck 10 itself has been omitted to create this picture while the virtual camera's field of view was adjusted so the target objects appear similar in size to the following close-up renderings of the curved mirrors shown in FIGS. 5-7. The image displays the natural perspective distortion as perceived by the human eye due to the fact that objects naturally appear smaller the further away they are.

Figure 5:
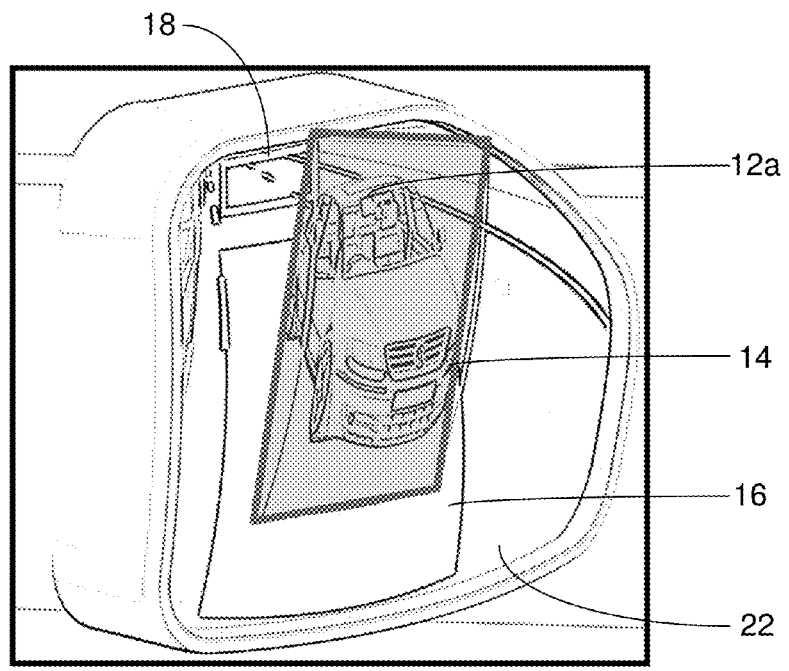
FIG. 5 shows a prior art spherical convex mirror surface reflection of the same perspective shown in FIG. 4.

Referring to FIG. 5, flat mirror surface 20 of FIG. 4 is now replaced by a mirror unit having a R450 mm spherical convex mirror surface 22. Reference target 14 now shows a significant distortion along both a vertical and horizontal axis across the face of spherical convex mirror surface 22 due to the constant curvature of the mirror surface 22.

Figure 6:
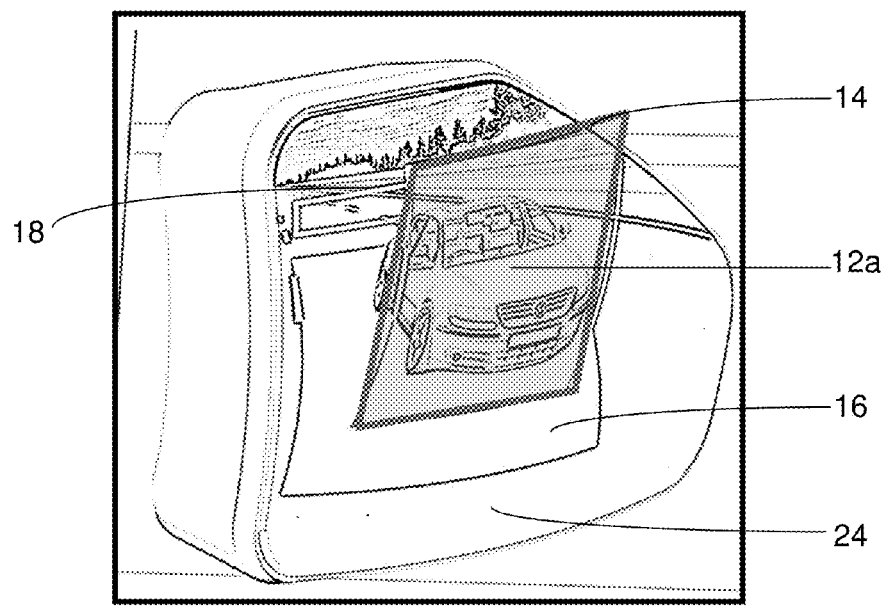
FIG. 6 shows a prior art dual radius convex mirror surface reflection of the same perspective shown in FIG. 4 in which the heightwise axis of curvature and the widthwise axis of curvature are perpendicular to each other.

Referring to FIG. 6, flat mirror surface 20 of FIG. 4 is now replaced by a mirror unit having a dual radius convex mirror surface 24 as taught in the prior art in which the heightwise axis of curvature and the widthwise axis of curvature of the mirror surface are arranged perpendicular to each other. While the width and height proportions of the objects in the image are better maintained as opposed to spherical convex mirror surface 22 of FIG. 5, the shape still exhibit a strong "sheer-distortion" making the image objects appear to be heavily slanted and leaning outboard, as best illustrated by reference target 14.

Figure 7:
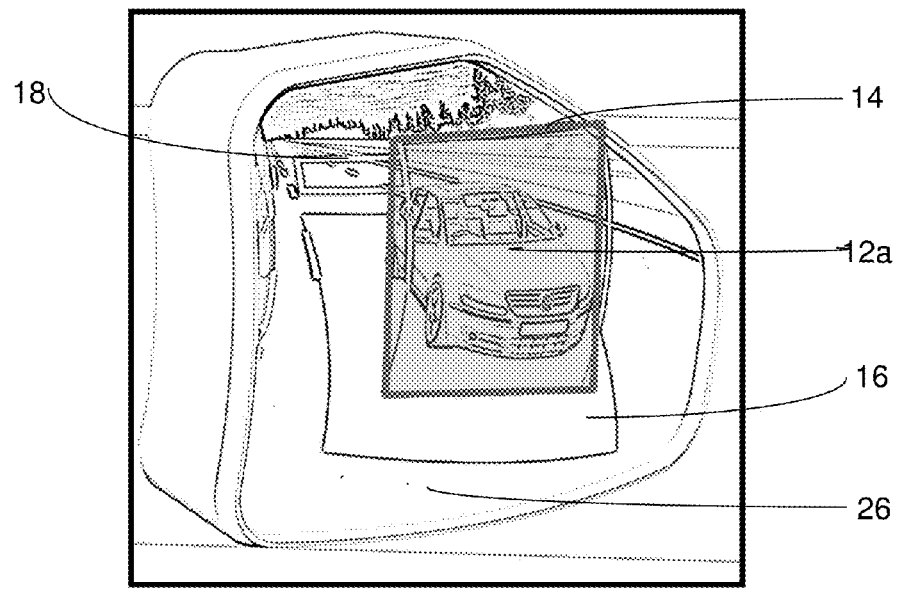
FIG. 7 shows a dual radius convex mirror surface reflection of the same perspective shown in FIG. 4 in which the heightwise axis of curvature and the widthwise axis of curvature are angled relative to each other according to the present invention.
Figure 9:
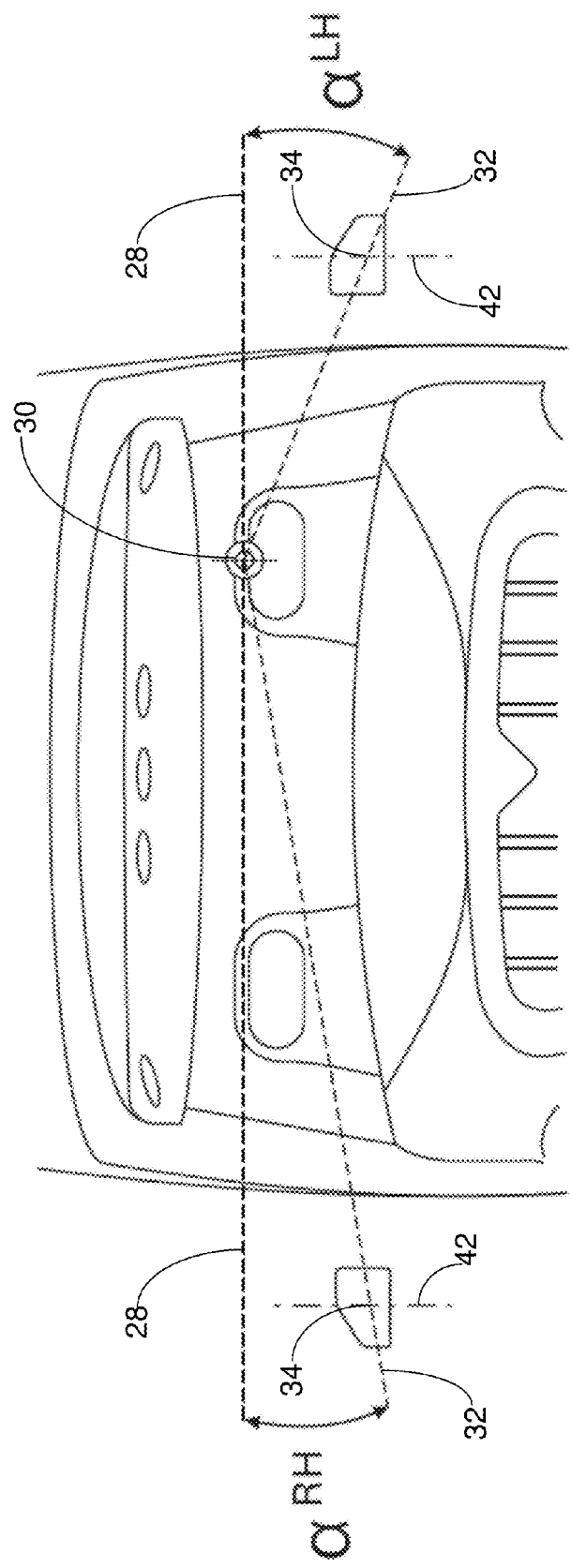
FIG. 9 shows a front view of a portion of a vehicle cab and the compensation angle between a predefined eye-point and mirror surface.

Referring to FIG. 7, flat mirror surface 20 of FIG. 4 is now replaced by a mirror unit having a low distortion dual radius convex mirror surface 26 according to the present invention in which the widthwise axis of curvature of mirror surface 26 is angled relative to the heightwise axis of curvature according to a compensation angle. With further reference to FIG. 9, the compensation angle is determined by the angle between a horizontal plane 28 created at a predefined eye point 30 of a driver and an intersect line 32 originating in the eye-point extending to a midpoint 34 of convex mirror surface 26 as it would be positioned in respect to the vehicle and mirror assembly. The image produced by utilizing a slanted dual radius mirror surface more faithfully maintains the width and height proportions of the targeted objects, as best illustrated by reference target 14, and straightens the objects counteracting the "sheer-distortion" exhibited by the known prior art dual radius mirrors as shown in FIG. 6.

Figure 10:
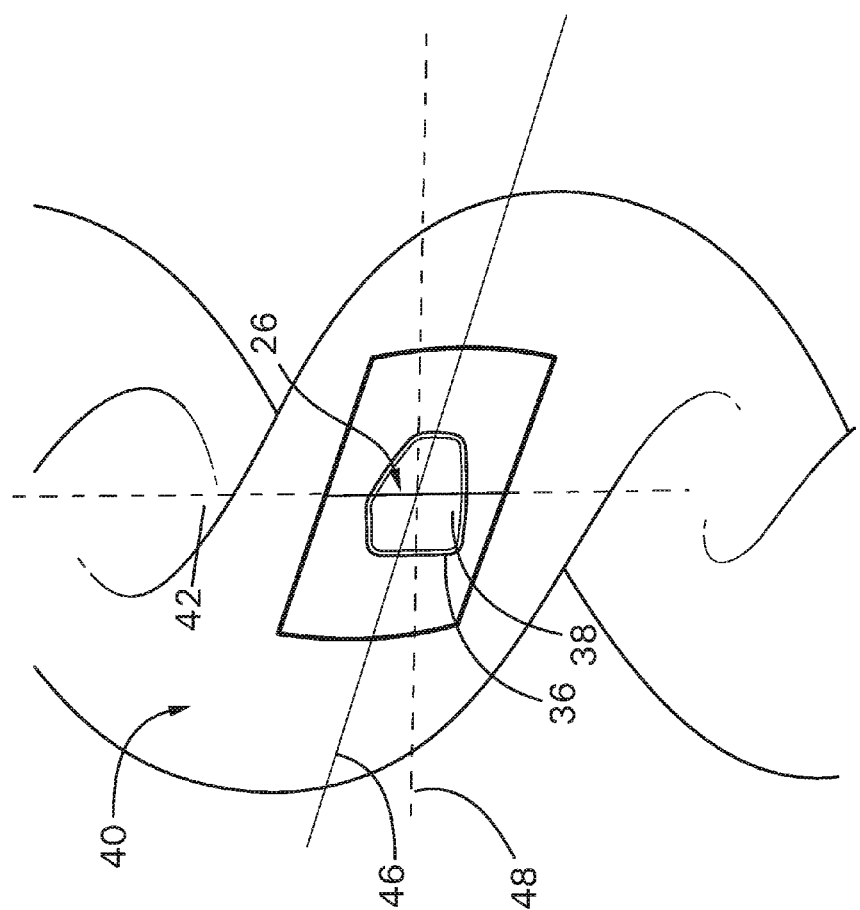
FIG. 10 shows a perspective view of a dual radius convex mirror surface according to the present invention.

Referring to FIG. 10, in the illustrated embodiment, the low distortion convex mirror includes a substrate 36 having a light reflective coating 38 defining the mirror surface, designated generally as 26. Preferably, substrate 36 is selected from the group consisting of plastic, metal, glass, carbon fiber, and combinations thereof.

Referring to FIG. 10, a first curvature is formed on substrate 36 extending across mirror surface 26 oriented along a first axis of curvature 42 extending heightwise. This first curvature is applied to the entire mirror surface 26 in the direction of first axis of curvature 42, which extends in a vertical orientation in the embodiment shown in FIG. 10. The first curvature extending along first axis of curvature 42 preferably has a constant radius of curvature. However, this first curvature can be formed with a variable radius of curvature if desired for a given mirror housing or application.

Referring to FIG. 10, a second curvature is formed on substrate 36 extending across mirror surface 26 oriented along a second axis of curvature 46 extending widthwise. This second curvature is applied to the entire mirror surface 26 in the direction of second axis of curvature 46, which extends at an angle to first axis of curvature 42 in the embodiment shown in FIG. 10. In the illustrated embodiment, the second curvature extending along second axis of curvature 46 preferably has a constant radius of curvature. However, this second curvature can be formed with a variable radius of curvature if desired for a given mirror housing or application.

Referring to FIG. 10, second axis of curvature 46 is angled relative to first axis of curvature 42 so that the second curvature extends across mirror surface 26 in a helical arrangement relative to first axis of curvature 42. A helical background form, designated generally as 40, is provided to illustrate the manner in which the second curvature extends across mirror surface 26 relative to the first curvature if mirror surface 26 was extended continually. Horizontal indicator 48, extending perpendicular to first axis of curvature 42, is provided for reference to help show the degree of angle between first axis of curvature 42 and second axis of curvature 46. Angling second axis of curvature 46 relative to first axis of curvature 42 results in the first and second curvatures cooperating to reduce distortion across mirror surface 26 depending on a given eye-point.

With reference to FIGS. 9 and 10, second axis of curvature 46 is angled relative to first axis of curvature 42 according to a compensation angle. In the illustrated embodiment, the compensation angle is defined by a predefined eye-point 30, a horizontal plane 28 created at predefined eye-point 30, and an intersect line 32 originating at predefined eye-point 30 extending to mirror surface 26 as it is positioned respective to a vehicle and intersecting first axis of curvature 42. Preferably, predefined eye-point 30 is designated within a vehicle cab at a location approximated to represent a line-of-sight view of a driver of a predetermined height within said vehicle cab to mirror surface 26. The compensation angle is measured as angle $\alpha$ between horizontal plane 28 and intersecting line 32 extending to mirror surface 26. Accordingly, referring to FIG. 8D, the angle of second axis of curvature 46 to first axis of curvature 42 can be defined as $90°+\alpha$.

In FIG. 9, by way of an example embodiment, the left side mirror surface 26 has a compensation angle $\alpha$ of approximately 22°, while right side mirror surface 26 has a compensation angle $\alpha$ of approximately 10°. The compensation angle accordingly varies based on the predefined eye-point location and available placement of the vehicle mirror which can increase or decrease the compensation angle.

Referring to FIGS. 1 and 8A-8D, an extended mirror surface projection, designated generally as 50, is shown to further illustrate how the helical arrangement between the first and second axis of curvatures 42 and 46 combine to produce the curvature of mirror surface 26.

Figure 11:
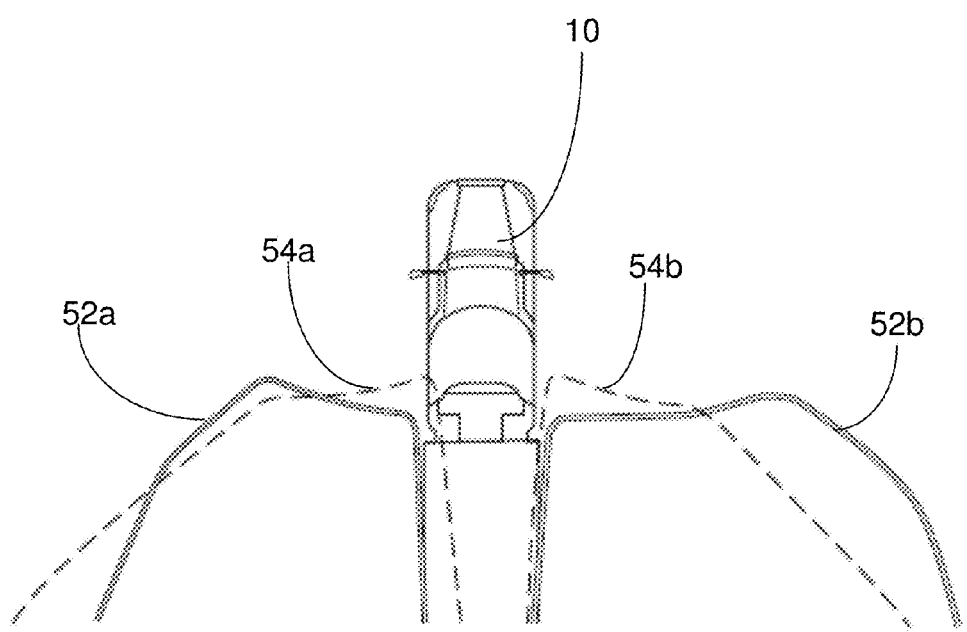
FIG. 11 shows a top view of the fields of view associated with a prior art convex mirror and the low distortion convex mirror of the present invention; and, FIGS. 12A-12C show comparative fields of view between a flat mirror surface and the convex mirror surface of the present invention as positioned relative to a left side and right side of a vehicle.

Referring to FIG. 11, incorporating the compensation angle into various dual radius mirror shapes, different application optimized mirror curvatures on the left and the right side of the vehicle can be provided to balance the field of view. The driver gets less distorted and more clear information about what's going on next to his vehicle. As shown in FIG. 11, the standard field of view to a driver for a traditional R450 spherical convex mirror is defined as fields of view 52a and 52b. Using an improved dual radius mirror with a compensation angle on the second axis of curvature according to the present invention, more balanced fields of view 54a and 54b can be achieved to provide the driver a more uniform appearance on both sides of the vehicle.

Figure 12A:
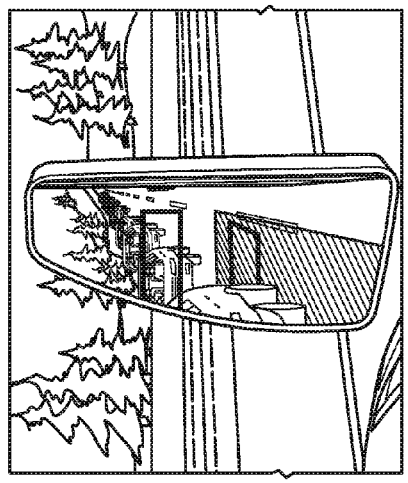
Figure 12C:
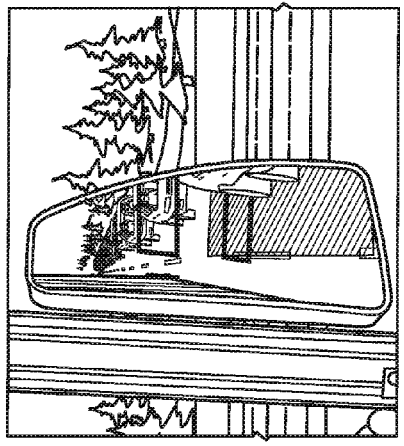
Figure 12B:
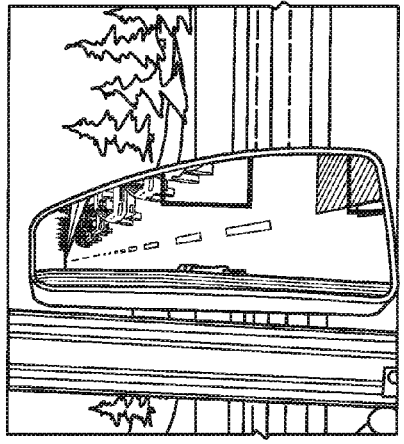

Referring to FIGS. 12A-12C, the same approach as for the wide angle mirrors illustrated in FIG. 11 can be used to provide a balanced field of view for the main mirror system as well. Historically, trucks have always been equipped with flat (unit magnification) mirror glass. One of the reasons for this was the distortion perceived when looking into convex curved mirrors. By incorporating slanted compensation angles (α) into the mirror surface as detailed above, the driver can get equalized symmetrical information from both sides of the vehicle. On the RH side he can still judge distances accurately when he applies the same perception rules as used on the LH side. Vehicles with equal distance appear now on the same spot on the mirror in reference to the mirror's frame. Thus, the images displayed between the left side flat mirror in FIG. 12A and the low distortion dual radius mirror with a compensation angle according to the present invention are largely similar, as compared with the right side flat mirror of FIG. 12B.

While a preferred embodiment of the invention has been described using specific terms, such description is for illustrative purposes only, and it is to be understood that changes and variations may be made without departing from the spirit or scope of the following claims.

What is claimed is:

1. A low distortion convex mirror for a vehicle rearview mirror assembly, said mirror comprising:
   a substrate having a light reflective coating defining a mirror surface;
   a first curvature included on said substrate extending across said mirror surface oriented along a first axis of curvature extending heightwise;
   a second curvature included on said substrate extending across said mirror surface oriented along a second axis of curvature extending widthwise, wherein said second axis of curvature is angled relative to said first axis of curvature so that said second curvature extends across said mirror surface in a helical arrangement relative to said first axis of curvature;
   whereby, angling said second axis of curvature relative to said first axis of curvature causes said first and second curvatures to cooperate in reducing distortion across said mirror surface.

2. The mirror of claim 1 wherein said substrate is selected from the group consisting of plastic, metal, glass, carbon fiber, and combinations thereof.

3. The mirror of claim 1 wherein said first curvature has a constant radius of curvature.

4. The mirror of claim 1 wherein said first curvature has a variable radius of curvature.

5. The mirror of claim 1 wherein said second curvature has a constant radius of curvature.

6. The mirror of claim 1 wherein said second curvature has a variable radius of curvature.

7. The mirror of claim 1 wherein said second axis of curvature is angled relative to said first axis of curvature according to a compensation angle.

8. The mirror of claim 7 wherein said compensation angle is defined by a predefined eye-point, a horizontal plane created at said predefined eye-point, and an intersect line originating at said predefined eye-point extending to said mirror surface as it is positioned respective to said vehicle and intersecting said first axis of curvature.

9. The mirror of claim 8 wherein said compensation angle is measured as angle α between said horizontal plane and said intersecting line extending to said mirror surface.

10. The mirror of claim 9 wherein said intersecting line extends to a midpoint of said mirror surface.

11. The mirror of claim 9 wherein the angle of said second axis of curvature to said first axis of curvature is defined as 90°+α.

12. The mirror of claim 8 wherein said predefined eye-point is designated within a vehicle cab at a location approximated to represent a line-of-sight view of a driver of a predetermined height within said vehicle cab to said mirror surface.

13. A vehicle mirror assembly having a low distortion convex mirror, said mirror assembly comprising:
   a housing;
   a support arm carrying said housing on an exterior of said vehicle for being viewed by a driver;
   a substrate having a light reflective coating defining a mirror surface, wherein said substrate is carried in said housing;
   a first curvature included on said substrate extending across said mirror surface oriented along a first axis of curvature extending heightwise;
   a second curvature included on said substrate extending across said mirror surface oriented along a second axis of curvature extending widthwise, wherein said second axis of curvature is angled relative to said first axis of curvature so that said second curvature extends across said mirror surface in a helical arrangement relative to said first axis of curvature;
   whereby, angling said second axis of curvature relative to said first axis of curvature causes said first and second curvatures to cooperate in reducing distortion across said mirror surface.

14. The mirror assembly of claim 13 wherein said second axis of curvature is angled relative to said first axis of curvature according to a compensation angle; wherein said compensation angle is defined by a predefined eye-point, a horizontal plane created at said predefined eye-point, and an intersect line originating at said predefined eye-point extending to said mirror surface as it is positioned respective to said vehicle.

15. The mirror assembly of claim 14 wherein said compensation angle is measured as angle α between said horizontal plane and said intersecting line extending to said mirror surface, and wherein the angle of said second axis of curvature to said first axis of curvature is defined as 90°+α.

16. The mirror assembly of claim 15 wherein said predefined eye-point is designated within a vehicle cab at a location approximated to represent a line-of-sight view of a driver of a predetermined height within said vehicle cab to said mirror surface.

17. The mirror assembly of claim 13 wherein at least one of said first curvature and said second curvature has a constant radius of curvature.

18. The mirror assembly of claim 13 wherein at least one of said first curvature and said second curvature has a variable radius of curvature.

19. A method of providing a low distortion convex mirror for a vehicle rearview mirror assembly, said method comprising the steps of:
   providing a substrate;
   applying a light reflective coating to said substrate defining a mirror surface;
   forming a first curvature on said substrate extending across said mirror surface oriented along a first axis of curvature extending heightwise;

forming a second curvature on said substrate extending across said mirror surface oriented along a second axis of curvature extending widthwise, wherein said second axis of curvature is angled relative to said first axis of curvature so that said second curvature extends across said mirror surface in a helical arrangement relative to said first axis of curvature;

whereby, angling said second axis of curvature relative to said first axis of curvature causes said first and second curvatures to cooperate in reducing distortion across said mirror surface.

20. The method of claim 19 including selecting said substrate from the group consisting of plastic, metal, glass, carbon fiber, and combinations thereof.

21. The method of claim 19 including the step of angling said second axis of curvature relative to said first axis of curvature according to a compensation angle.

22. The method of claim 21 including a step of defining said compensation angle by selecting a predefined eye-point, designating a horizontal plane extending at said predefined eye-point, and extending an intersect line originating at said predefined eye-point to said mirror surface as it is positioned respective to said vehicle.

23. The method of claim 22 including a step of measuring the angle between said horizontal plane and said intersecting line extending to said mirror surface to determine an angle $\alpha$ defining said compensation angle.

24. The method of claim 23 including the step of extending said intersecting line to a midpoint of said mirror surface.

25. The method of claim 23 including the step of angling said second axis of curvature $90°+\alpha$ relative to said first axis of curvature.

26. The method of claim 22 including the step of selecting said predefined eye-point within a vehicle cab at a location approximated to represent a line-of-sight view of a driver of a predetermined height within said vehicle cab to said mirror surface.

* * * * *